(12) United States Patent
Chatterjee et al.

(10) Patent No.: US 11,263,704 B2
(45) Date of Patent: Mar. 1, 2022

(54) CONSTRAINED MULTI-SLOT OPTIMIZATION FOR RANKING RECOMMENDATIONS

(71) Applicant: Microsoft Technology Licensing, LLC, Redmond, WA (US)

(72) Inventors: Shaunak Chatterjee, Sunnyvale, CA (US); Ankan Saha, San Francisco, CA (US); Kinjal Basu, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 623 days.

(21) Appl. No.: 15/400,738

(22) Filed: Jan. 6, 2017

(65) Prior Publication Data

US 2018/0197097 A1   Jul. 12, 2018

(51) Int. Cl.
  *G06Q 50/00*   (2012.01)
  *G06N 5/00*    (2006.01)
  *G06N 5/02*    (2006.01)
  *G06N 20/00*   (2019.01)

(52) U.S. Cl.
  CPC ............ *G06Q 50/01* (2013.01); *G06N 5/003* (2013.01); *G06N 5/022* (2013.01); *G06N 20/00* (2019.01)

(58) Field of Classification Search
  CPC ................................ G06N 5/003; G06N 5/022
  See application file for complete search history.

(56) References Cited

U.S. PATENT DOCUMENTS

| | | | |
|---|---|---|---|
| 7,594,189 B1 * | 9/2009 | Walker ................ | G06F 16/9535 715/811 |
| 7,792,815 B2 * | 9/2010 | Aravamudan .... | G06F 16/24578 707/708 |
| 8,918,404 B1 * | 12/2014 | Dachille ............... | G06F 16/958 707/748 |
| 9,582,786 B2 * | 2/2017 | Gubin ................... | G06Q 10/10 |

(Continued)

OTHER PUBLICATIONS

Alexander Engau et al., "2D Decision-making for Multicriteria Design Optimization", Springer for Research and Development, Oct. 2007, vol. 34, Issue 4, pp. 301-315. [Research Paper first online: Dec. 12, 2006], (Year: 2007).*

(Continued)

*Primary Examiner* — Alexey Shmatov
*Assistant Examiner* — Beatriz Ramirez Bravo
(74) *Attorney, Agent, or Firm* — Schwegman Lundberg & Woessner, P.A.

(57) ABSTRACT

A system, a machine-readable storage medium storing instructions, and a computer-implemented method are described herein are directed to a Content Optimization Engine that determines a display probability for each content item in a set of content items. Each respective display probability corresponds to a given content item's probability of display in a specific content slot of a plurality of content slots in a social network feed of a target member account in a social network service. The Content Optimization Engine calculates a selection probability for each content item in an ordered set of the content items, based on each display probability and a set of interaction effects. The Content Optimization Engine causes display of the ordered set of content items in the target member account's social network feed based on satisfaction of the first and second targets.

18 Claims, 7 Drawing Sheets

(56) References Cited

U.S. PATENT DOCUMENTS

| | | | | |
|---|---|---|---|---|
| 2009/0248513 | A1* | 10/2009 | Aggarwal | G06Q 30/02 705/14.72 |
| 2011/0125572 | A1* | 5/2011 | Cantu-Paz | G06Q 30/02 705/14.43 |
| 2011/0153421 | A1* | 6/2011 | Novikov | G06Q 30/0254 705/14.52 |
| 2011/0191315 | A1* | 8/2011 | Neumeyer | G06Q 30/0243 707/706 |
| 2011/0288935 | A1* | 11/2011 | Elvekrog | G06Q 30/0241 705/14.53 |
| 2012/0259919 | A1* | 10/2012 | Yan | G06Q 30/0245 709/204 |
| 2013/0325588 | A1* | 12/2013 | Kalyanam | G06Q 30/0243 705/14.42 |
| 2014/0136460 | A1* | 5/2014 | Amid | G06F 3/04842 706/46 |
| 2015/0019640 | A1* | 1/2015 | Li | G06F 3/00 709/204 |
| 2015/0074027 | A1* | 3/2015 | Huang | G06N 3/0454 706/25 |
| 2015/0199715 | A1* | 7/2015 | Caron | G06Q 30/0241 705/14.52 |
| 2016/0063574 | A1* | 3/2016 | You | G06Q 30/0275 705/14.71 |
| 2016/0342599 | A1* | 11/2016 | Koutrika | G06F 16/335 |
| 2017/0061515 | A1* | 3/2017 | Hummel | G06F 16/248 |
| 2017/0091805 | A1* | 3/2017 | Tu | G06Q 30/0244 |
| 2017/0148049 | A1* | 5/2017 | Shirazi | G06Q 30/0244 |
| 2018/0121964 | A1* | 5/2018 | Zhang | G06Q 30/0269 |
| 2018/0139293 | A1* | 5/2018 | Dimson | H04L 51/32 |
| 2018/0189822 | A1* | 7/2018 | Kulkarni | G06Q 30/0244 |

OTHER PUBLICATIONS

Alexander Engau et al., "2D Decision-making for Multicriteria Design Optimization", Springer For Research & Development, (2007). (Year: 2007).*

* cited by examiner

CONSTRAINED MULTI-SLOT OPTIMIZATION FOR RANKING RECOMMENDATIONS

TECHNICAL FIELD

The subject matter disclosed herein generally relates to the technical field of special-purpose machines that identify a set of content for display, including software-configured computerized variants of such special-purpose machines and improvements to such variants, and to the technologies by which such special-purpose machines become improved compared to other special-purpose machines that facilitate identification of a set of content for display.

BACKGROUND

A social networking service is a computer- or web-based application that enables users to establish links or connections with persons for the purpose of sharing information with one another. Some social networking services aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the figures of the accompanying drawings in which.

DETAILED DESCRIPTION

The present disclosure describes methods and systems for ranking content items to be displayed in a content feed in a professional social networking service (also referred to herein as a "professional social network," "social network" or a "social network service"). In the following description, for purposes of explanation, numerous specific details are set forth in order to provide a thorough understanding of the various aspects of different embodiments of the subject matter described herein. It will be evident, however, to one skilled in the art, that the subject matter described herein may be practiced without all of the specific details.

A system, a machine-readable storage medium storing instructions, and a computer-implemented method are described herein are directed to Content Optimization Engine. The Content Optimization Engine identifies a set of content items relevant to a target member account. Such relevance is determined according to a machine learning data model and one or more types of content features and one or more types of member account features—as defined by the machine learning data model. The Content Optimization Engine processes the set of content items according to a multi-objective optimization algorithm to generate an ordered set of content items, where the ordered set of content items includes a diversity of content item types that meets a plurality of threshold requirements that are in conflict with each other—such as satisfying a desired level of engagement of the target member account and also satisfying desired level of revenue generation.

According to various embodiments, the Content Optimization Engine determines a display probability for each content item in a set of content items. Each respective display probability corresponds to a given content item's probability of display in a specific content slot of a plurality of content slots in a social network feed of a target member account in a social network service. The Content Optimization Engine calculates a selection probability for each content item in an ordered set of the content items based on each display probability and a set of interaction effects. The ordered set of the content items assigns each content item to a specific content slot in the target member account's social network feed in order to meet both a first target of expected social network activity (e.g. content selection, complaint) and a second target of expected revenue generation. The Content Optimization Engine causes display of the ordered set of content items in the target member account's social network feed based on satisfaction of the first and second targets. It is understood that a "member account" in a social network service can also be referred to herein as a "user."

A content slot is a portion of a user interface of a social network feed at which a content item can be displayed. Each member account has its own social network feed. A plurality of distinct content slots can be positioned throughout the social network feed. In some embodiments, a first content item is temporarily assigned to a particular content slot during a first social network session. During a subsequent second social network session, a second content item is temporarily assigned to the particular content slot.

Ranking content items to be recommended for display in a user's feed is a challenge in large scale social media applications. Various embodiments of the Content Optimization Engine are described herein for determining a ranking of content items according to multi-objective optimization algorithm in order to allow for the trading off of multiple, potentially conflicting objectives against each other. Current conventional systems optimize for a single content feed slot without considering the effect(s) of user interaction with other content items. An interaction effect occurs when a probability of user interaction (such as content selection) with a first content item to be displayed at a content slot of the user's feed is modified based on a probability of a user's interaction with a second content item concurrently displayed at another content slot of the user's feed.

Stated differently, if the first and second content items are of the same content type, then a likelihood that the user will access the first content item may be influenced by whether or not the user accesses the second content item before accessing the first content item—and vice versa. For example, where two content items are political news articles and both are scored as highly relevant to the user, displaying the two content items in the user's feed proximate to each other may result in the user favoring one content item over the other since the user may not be interested in reading two political news articles during the same social network session. As such, the content slot in the user's feed that is occupied by the ignored political news article can be better utilized by a content item of a different content item type or a sponsored content item that could generate revenue—even though the different content item and the sponsored content item may not be scored as being as relevant to the user as the content items providing access to the political news articles.

The Content Optimization Engine identifies an ordered set of content items for all available content slots in a user's social network feed in order to optimize a display of a diversity of various types of content items. Such optimization is a constrained multi-slot-optimization solution based on competing requirements to generate a ranking of diverse types of content items likely to meet or exceed a desired user engagement level, where the ranking also includes one or more sponsored content items that are likely generate a target revenue.

The Content Optimization Engine identifies a plurality of candidate content items, machine learning features of each candidate item and machine learning feature of a target member account and determines a set of content items ranked according to their relevance to the target member account and the interaction effects amongst each other such that display of the set of content items in the target member account's feed will prompt user engagement that satisfies a target engagement level. However, in addition, the ranked set of content items further includes one or more sponsored content items such that a target revenue goal can still be achieved.

It is understood that various embodiments described herein include encoded instructions that comprise operations to generate a user interface(s) and various user interface elements. The user interface and the various user interface elements can be displayed to be representative of any of the member account features, the content item features, data models, content items, member accounts and content feed. In addition, the user interface and various user interface elements are generated by the Content Optimization Engine for display on a computing device, a server computing device, a mobile computing device, etc.

It is understood that a machine learning data model is represented according to one more encoded instructions that, when executed, perform calculations that result in inferences, predictions, conclusions and estimations based in part on the training data. In one example, the machine learning data model can be a logistic regression model having one or more encoded instructions for feature vector assembly.

Figure 1:
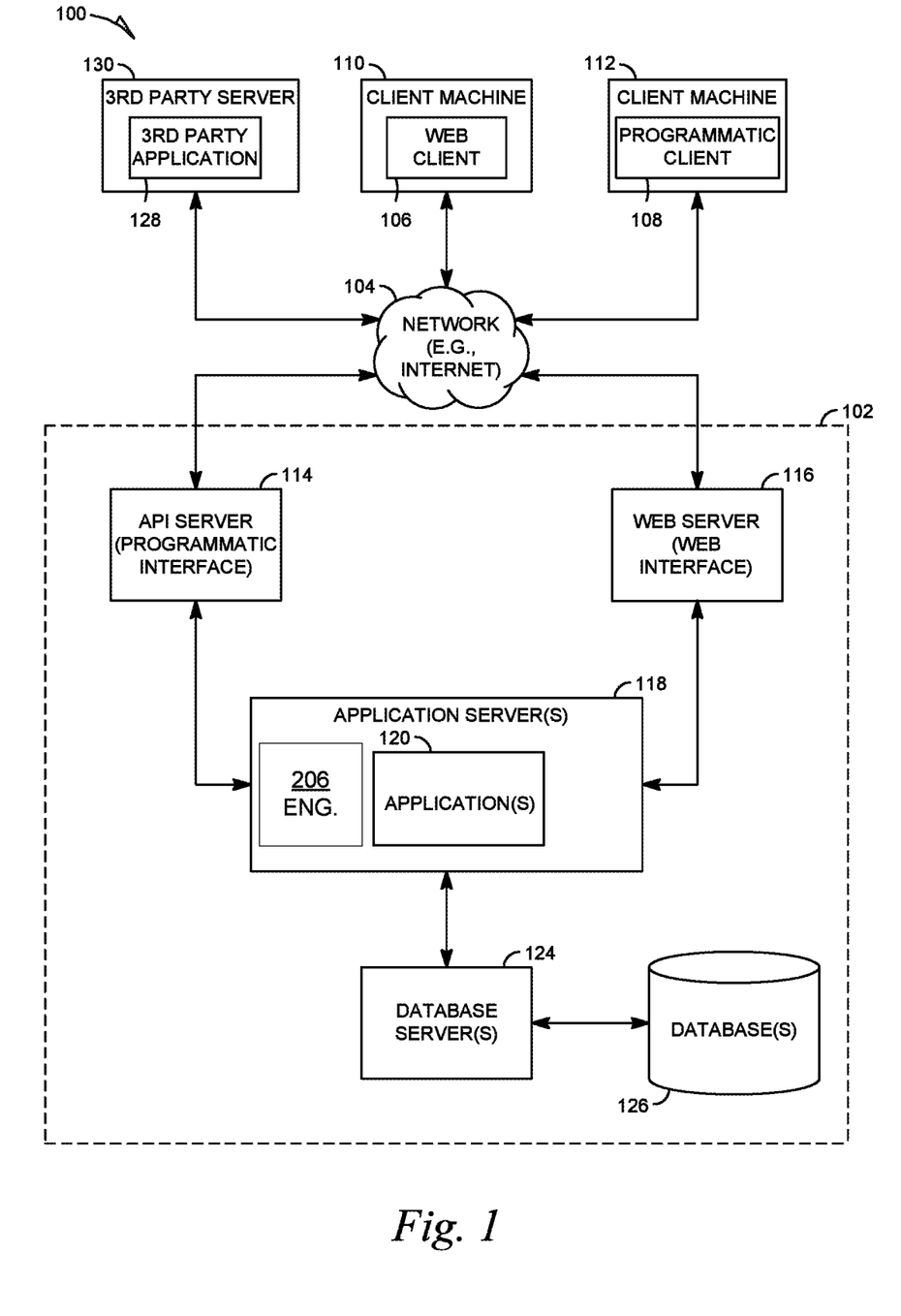
FIG. 1 is a block diagram illustrating a client-server system, in accordance with an example embodiment.

Turning now to FIG. 1, FIG. 1 is a block diagram illustrating a client-server system, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102. In some embodiments, the networked system 102 may comprise functional components of a professional social network.

Figure 2:
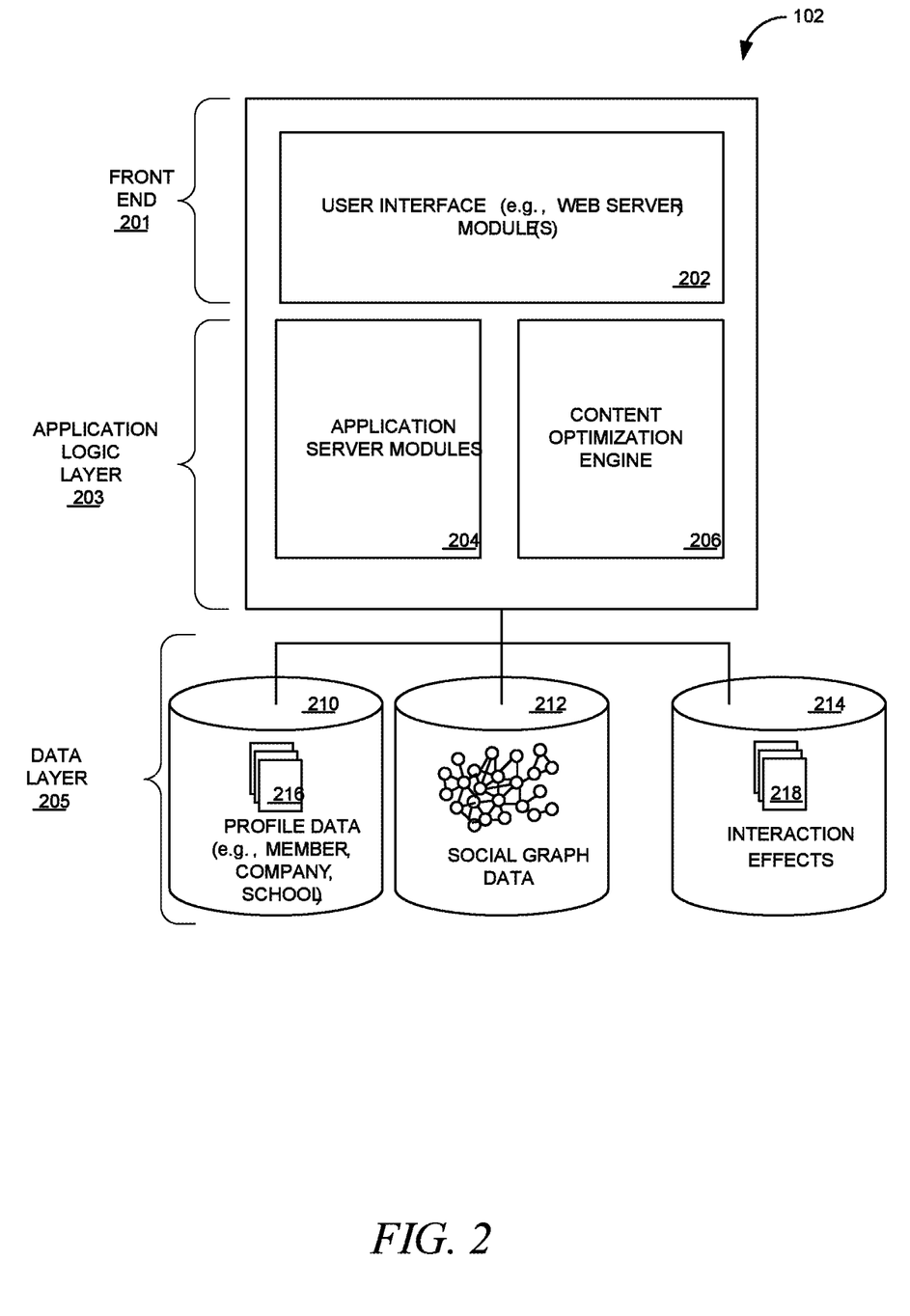
FIG. 2 is a block diagram showing functional components of a professional social network within a networked system, in accordance with an example embodiment.

FIG. 2 is a block diagram showing functional components of a professional social network within the networked system 102, in accordance with an example embodiment.

As shown in FIG. 2, the professional social network may be based on a three-tiered architecture, consisting of a front-end layer 201, an application logic layer 203, and a data layer 205. In some embodiments, the modules, systems, and/or engines shown in FIG. 2 represent a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 2. However, one skilled in the art will readily recognize that various additional functional modules and engines may be used with a professional social network, such as that illustrated in FIG. 2, to facilitate additional functionality that is not specifically described herein. Furthermore, the various functional modules and engines depicted in FIG. 2 may reside on a single server computer, or may be distributed across several server computers in various arrangements. Moreover, although a professional social network is depicted in FIG. 2 as a three-tiered architecture, the inventive subject matter is by no means limited to such architecture. It is contemplated that other types of architecture are within the scope of the present disclosure.

As shown in FIG. 2, in some embodiments, the front-end layer 201 comprises a user interface module (e.g., a web server) 202, which receives requests and inputs from various client-computing devices, and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204.

As shown in FIG. 2, the data layer 205 may include several databases, such as a database 210 for storing profile data 216, including both member profile attribute data as well as profile attribute data for various organizations. Consistent with some embodiments, when a person initially registers to become a member of the professional social network, the person will be prompted to provide some profile attribute data such as, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network the representative may be prompted to provide certain information about the organization. This information may be stored, for example, in the database 210, or another database (not shown). With some embodiments, the profile data 216 may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or a seniority level within a particular company. With some embodiments, importing or otherwise accessing data from one or more externally hosted data sources may enhance profile data 216 for both members and organizations. For instance, with companies in particular, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

Once registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, may be stored and maintained as social graph data within a social graph database 212.

The professional social network may provide a broad range of other applications and services that allow members the opportunity to share and receive information, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module via which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. In particular, some third-party applications may reside and execute on one or more mobile devices (e.g., a smartphone, or tablet computing devices) having a mobile operating system.

The data in the data layer 205 may be accessed, used, and adjusted by the Content Optimization Engine 206 as will be described in more detail below in conjunction with FIGS. 3-7. Although the Content Optimization Engine 206 is referred to herein as being used in the context of a professional social network, it is contemplated that it may also be employed in the context of any website or online services, including, but not limited to, content sharing sites (e.g., photo- or video-sharing sites) and any other online services that allow users to have a profile and present themselves or content to other users. Additionally, although features of the present disclosure are referred to herein as being used or presented in the context of a web page, it is contemplated that any user interface view (e.g., a user interface on a mobile device or on desktop software) is within the scope of the present disclosure. In one embodiment, the data layer 205 further includes a database 214 that includes interaction effects 218 based on social network activity of one or more member accounts.

Figure 3:
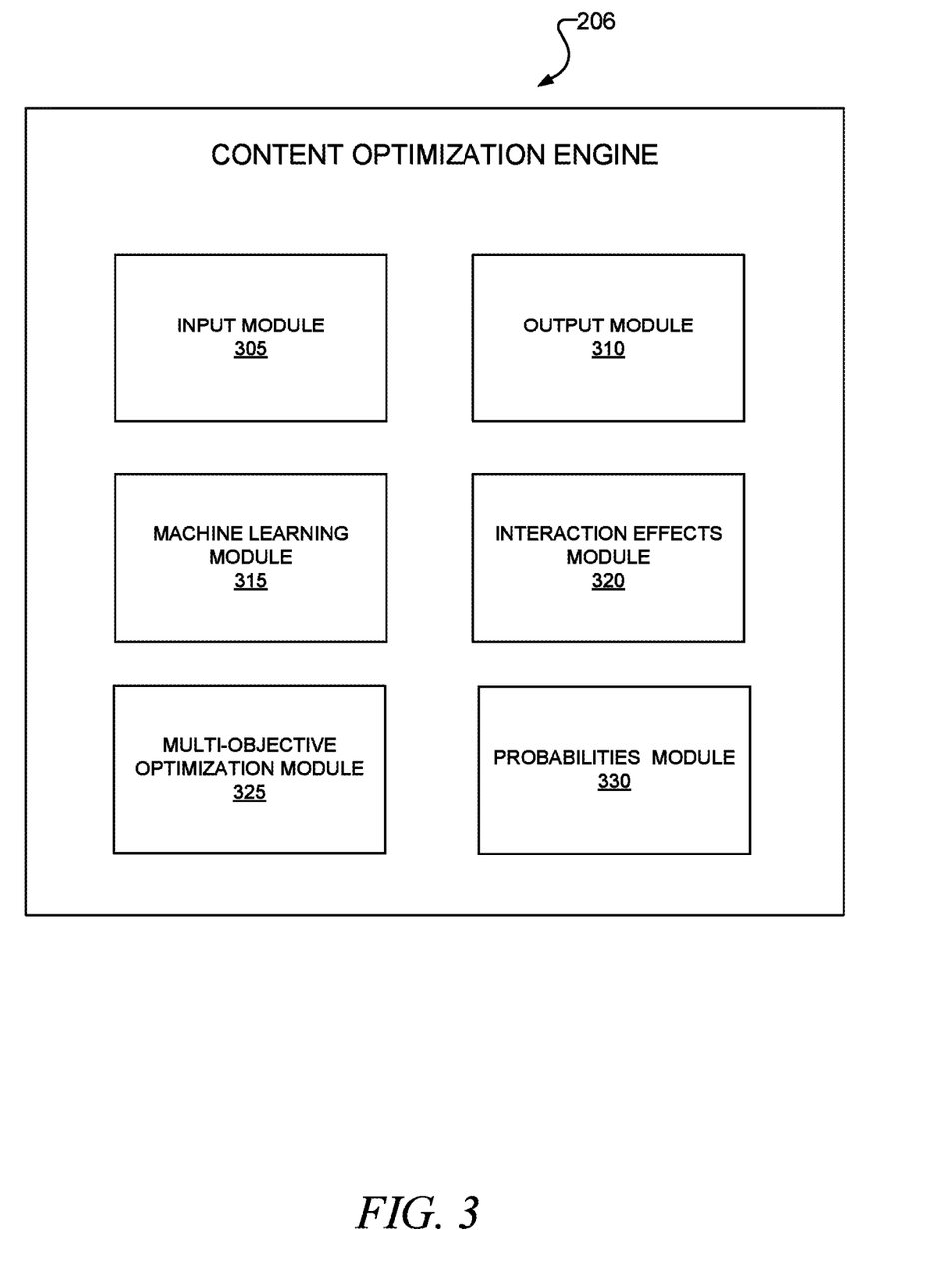
FIG. 3 is a block diagram showing example components of a Content Optimization Engine, according to some embodiments.

FIG. 3 is a block diagram showing example components of a Content Optimization Engine 206, according to some embodiments.

The input module 305 is a hardware-implemented module that controls, manages and stores information related to any inputs from one or more components of system 102 as illustrated in FIG. 1 and FIG. 2. In various embodiments, the inputs include a plurality of content items, a target member account, training data, one or more historical interaction effects.

The output module 310 is a hardware-implemented module that controls, manages and stores information related to which sends any outputs to one or more components of system 100 of FIG. 1 (e.g., one or more client devices 110, 112, third party server 130, etc.). In some embodiments, the output is an ordered set of content items that includes a diversity of content item types. Each content item in the ordered set of content items is assigned a specific content slot in a social network feed of the target member account. The diversity of types of content items and the specific content slot assignments satisfy competing requirements of a multi-objective optimization algorithm.

The machine learning module 315 is a hardware implemented module which manages, controls, stores, and accesses information related to building, training, updating and executing a machine learning data model. In some embodiments, a plurality of content items and the target member account are input for the machine learning data model, which returns a set of content items determined by the machine learning data model as relevant to the target member account. In some embodiments, the machine learning data model is a logistic regression model having one or more type of features with corresponding regression coefficients. It is understood that the machine learning data model is built and refined according to training data which is based on historical social network activity data and historical member account data and profile data of one or more member accounts.

The interaction effects module 320 is a hardware-implemented module which manages, controls, stores, and accesses information related to collecting interaction effects for a set of interaction effects. In some embodiments, the interaction effects module 320 collects member account behavior (such as content selection or complaint behavior) that results when a specific pair(s) of content items are concurrently displayed at various content feed slots.

The multi-objective optimization module 325 is a hardware-implemented module which manages, controls, stores, and accesses information related to executing a multi-objective optimization algorithm.

The probabilities module 330 is a hardware-implemented module which manages, controls, stores, and accesses information related to calculating content display probabilities and content selection probabilities. A content display probability represents a likelihood that a content item relevant to the target member account will be displayed at a specific content feed slot concurrently with display of other relevant content items assigned to other content feed slots. A content selection probability represents a likelihood that a content item displayed at a specific content feed slot will be selected (i.e. clicked on, accessed, viewed, shared, commented, liked) by the target member account while one or more other content items are concurrently displayed at other content feed slots.

Figure 4:
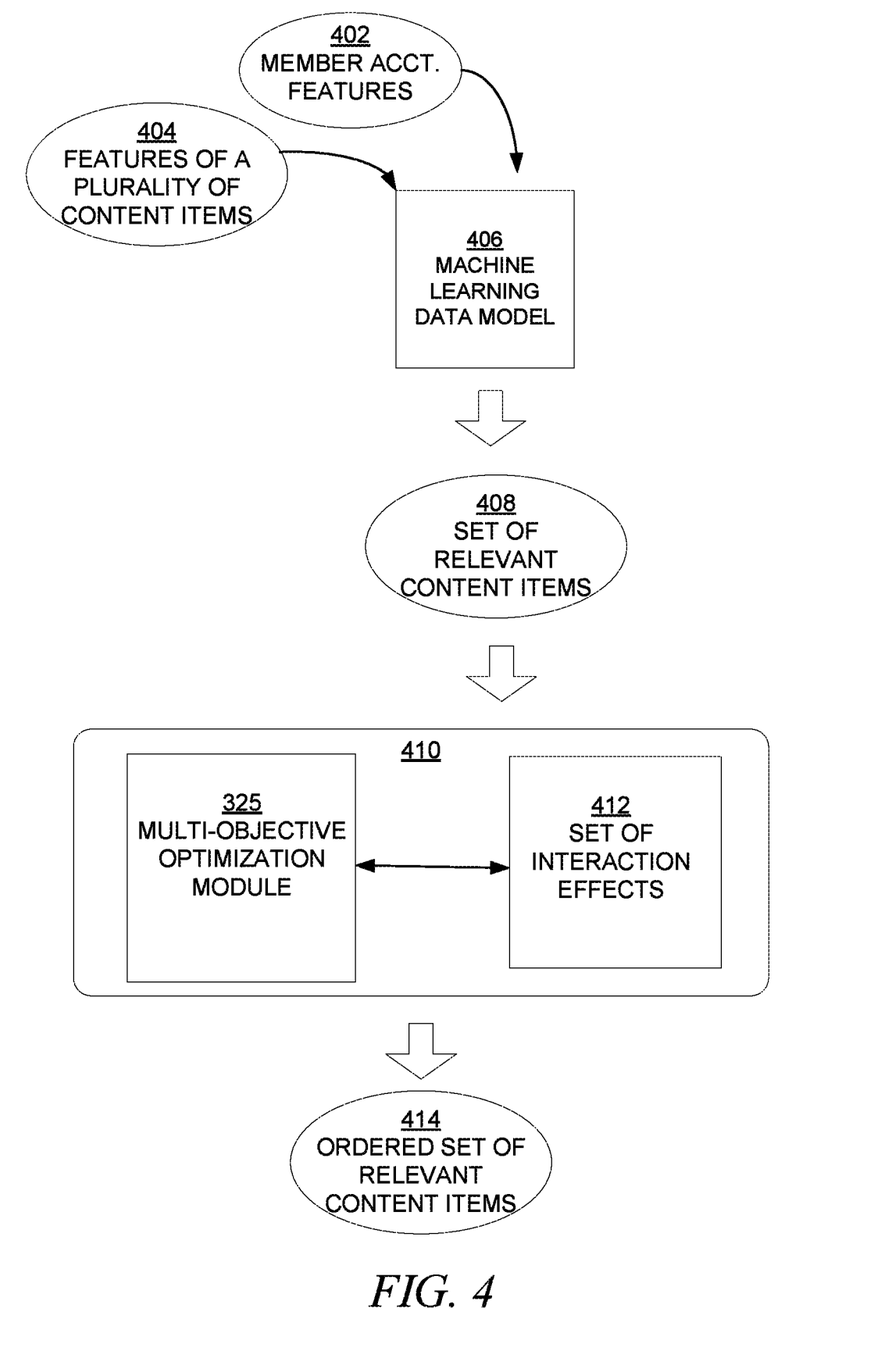
FIG. 4 is a block diagram showing a data flow in a Content Optimization Engine, according to example embodiments.

FIG. 4 is a block diagram showing a data flow in a Content Optimization Engine 206, according to an example embodiment.

The Content Optimization Engine 206 applies a machine learning data model 406 on a plurality of content items in order to identify a set of relevant candidate content items 408 based on one or more type of content item features 404 present in the plurality of content items and one or more types of member account features 402 present in profile data of a target member account. It is understood that the machine learning data model 406 has one or more learned content item features and one or more learned member account features. There are a plurality of types of content item features and a plurality of type of member account features.

In various embodiments, the machine learning data model can be a logistic regression model that has one or more encoded instructions for assembling feature vector data based on machine learning data model features and regression coefficients. The machine learning data model 406 determines a set of relevant content items 408 that includes one or more types of content items that are scored as being relevant to the target member account. In some embodiments, the set of relevant content items 408 can be a ranked list of most relevant content items, such that the first candidate content item is the most relevant content item and the second candidate content item is the second-most relevant content item and the last candidate content item in the ranking is the least relevant content item from the plurality of content items.

The Content Optimization Engine 206 inserts the set of relevant candidate content items 408 into an optimizer 410. The optimizer 410 includes a multi-objective optimization module 325 and a set of interaction effects 412. The optimizer 410 processes the set of relevant candidate content items 408 via the multi-objective optimization module 325 and the set of interaction effects 412 in order to identify an ordered set of relevant content items 414. The ordered set of relevant content items 414 describes each content item to be displayed in a particular content slot of the target member account's social network content feed. The ordered set of relevant content items 414 includes a diversity of content item types that—when concurrently displayed in target member account's social network content feed—satisfies competing targets of a multi-objective optimization algorithm.

Figure 5:
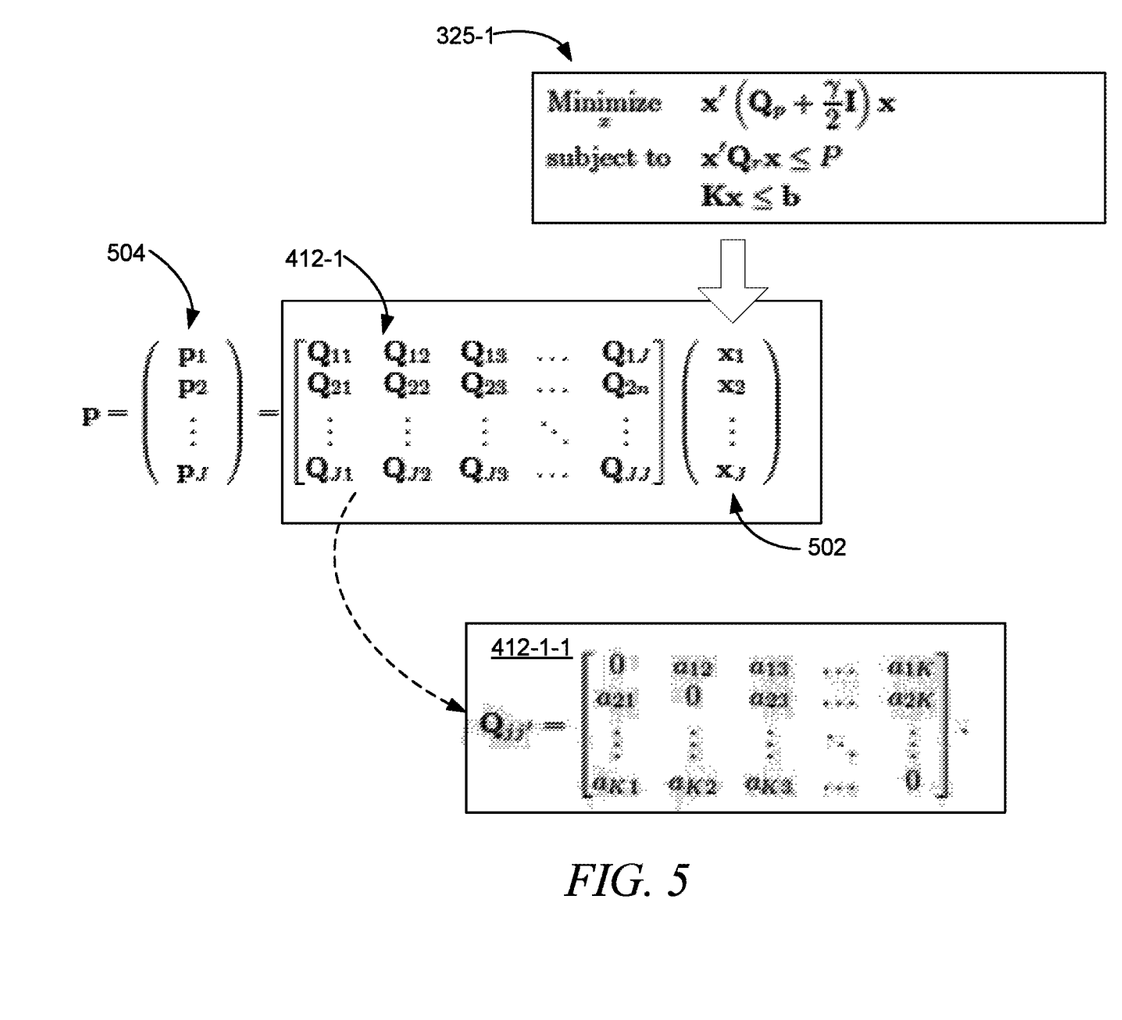
FIG. 5 is a block diagram representing the operations and data structures of a Content Optimization Engine, according to example embodiments.

FIG. 5 is a block diagram representing the operations and data structured of a Content Optimization Engine 206, according to an example embodiment.

The Content Optimization Engine 206 executes a multi-objective optimization algorithm 325-1 in order to determine which of the relevant candidate content items 408, 1-j, should be displayed—and in which content feed slot, 1-k. The Content Optimization Engine 206 calculates a probability (p) that a candidate content item will be clicked on. Such a probability (p) for each candidate content item will account for interaction effects of other candidate content items that may be concurrently displayed in the target member account's content feed.

The Content Optimization Engine 206 represents a vector (p) of vectors 504 of content item selection probabilities. That is, for the set of candidate items 408, 1-j, $p_1$ itself represents a vector of size k, $p_2$ represents a vector of size k and $p_j$ represents a vector of size k. Vector $p_1$ has vector units $p_{11}, p_{12} \ldots p_{1k}$. Vector $p_2$ has vector units $p_{21}, p_{22} \ldots p_{2k}$. Vector $p_j$ has vector units $p_{j1}, p_{j2} \ldots p_{jk}$. For example, vector $p_1$, corresponds to a first candidate content item (such as a news article) to be clicked when assigned to the different content slots. It follows then, that a vector unit ($p_{11}$) represents a probability that the first candidate content item will be clicked on if displayed at the first content feed slot. Further, a vector unit ($p_{12}$) represents a probability that the first candidate content item will be clicked if displayed at the second feed slot. Similarly, a vector unit ($p_{1k}$) represents a probability that the first candidate content item will be clicked if displayed at the k-th feed slot. For a second candidate content item, such as a sponsored content item, the corresponding vector is $p_2$. It follows then, that a vector unit ($p_{21}$) represents a probability that the second candidate content item will be clicked on if displayed at the first content feed slot. Similarly, a vector unit ($p_{2k}$) represents a probability that the second candidate content item will be clicked if displayed at the k-th feed slot. The Content Optimization Engine 206 selects from the vector (p) of vectors 504 a select vector that represents an ordered set of candidate items that best satisfies the competing requirements of the multi-objective optimization.

The Content Optimization Engine 206 represents a vector (x) of vectors 502 of content item display probabilities. That is, for the set of candidate items 408, 1-j, $x_1$ itself represents a vector of size k, $x_2$ represents a vector of size k and $x_j$ represents a vector of size k. Vector $x_1$ has vector units $x_{11}, x_{12} \ldots x_{1k}$. Vector $x_2$ has vector units $x_{21}, x_{22} \ldots x_{2k}$. Vector $x_1$ has vector units $x_{j1}, x_{j2} \ldots x_{jk}$. A vector unit ($x_{11}$) in vector $x_1$ represents a probability of displaying the first candidate content item at the first content feed slot. A vector unit ($x_{12}$) in vector $x_1$ represents a probability of displaying the first candidate content item at the second content feed slot, and a vector unit ($x_{1k}$) represents a probability of displaying the first candidate content item at the k-th content feed slot. Similarly, A vector unit ($x_{21}$) in vector $x_2$ represents a probability of displaying the second candidate content item at the first content feed slot. A vector unit ($x_{22}$) in vector $x_2$ represents a probability of displaying the second candidate content item at the second content feed slot, and a vector unit ($x_{2k}$) represents a probability of displaying the second candidate content item at the k-th content feed slot.

The Content Optimization Engine 206 builds (i.e. assembles) the vector (x) of vectors 502 according to a multi-objective optimization algorithm 325-1 executed by the multi-objective optimization module 325. The matrix $Q_p$ represents the matrix of matrices 412-1 which corresponds to the interaction factors of clicks on different items spread across different slots. The factor γ is a regularizing weight associated to the objective function of the multi-objective optimization algorithm 325-1. The matrix I is an identity matrix having 1 in all the diagonal entries and 0 everywhere else. The matrix $Q_r$ represents the matrix of matrices similar to 412-1 which corresponds to the interaction factors of complaints on different items spread across different slots. P represents a scalar threshold of the complaints. The matrix K formulates a set of linear constraints that the display probability must hold. Finally b represents the thresholds on the linear constraints on the display probability (x).

The Content Optimization Engine 206 further represents a matrix of Matrices 412-1 in the set of interaction effects 412. Each individual matrix $Q_{11}, Q_{12}, Q_{13} \ldots Q_{jj}$ models the interaction effects between a pair of content items when they are concurrently displayed at a pair of content slots in the same social network content feed. That is, each matrix based on example matrix $Q_{jj'}$ 412-1-1 as including a plurality of different values (a) of interaction effects for candidate content items j and j' when concurrently displayed at a pair of content feed slots from content slot 1-k. For example, matrix $Q_{12}$ represents the interaction effects between the $1^{st}$ candidate content item and the $2^{nd}$ candidate content item when concurrently displayed at various content feed slots. For example, in matrix $Q_{12}$, $a_{12}$ relates to the first and second content feed slots. Specifically, $a_{12}$ of matrix $Q_{12}$ is a pre-calculated value representing an interaction effect between the $1^{st}$ and $2^{nd}$ candidate content items when the $1^{st}$ candidate content item is displayed in the $1^{st}$ contend feed slot while the $2^{nd}$ candidate content item is displayed in the $2^{nd}$ content feed slot. In addition, in matrix $Q_{12}$, $a_{23}$ is a pre-calculated value representing an interaction effect between the $1^{st}$ and $2^{nd}$ candidate content items when the $1^{st}$ candidate content item is displayed in the $2^{nd}$ contend feed slot and the $2^{nd}$ candidate content item is displayed in the $3^{rd}$ content feed slot. Further, in matrix $Q_{12}$, $a_{k3}$ is a pre-calculated value representing an interaction effect between the $1^{st}$ and $2^{nd}$ candidate content items when the $1^{st}$ candidate content item is displayed in the K-th content feed slot and the $2^{nd}$ candidate content item is displayed in the $3^{rd}$ content feed slot.

It follows, then, that matrix $Q_{13}$ models interaction effects between the $1^{st}$ and $3^{rd}$ candidate content items. The pre-defined value of $a_{23}$ in matrix $Q_{13}$ represents an interaction effect between the $1^{st}$ and $3^{rd}$ candidate content items when the $1^{st}$ candidate content item is displayed in the $2^{nd}$ contend feed slot and the $3^{rd}$ candidate content item is displayed in the $3^{rd}$ content feed slot. Matrix $Q_{j3}$ thereby represents the interaction effects between the j-th candidate content item and the $3^{rd}$ candidate content item. Therefore, for $Q_{13}$, $a_{12}$ represents the interaction effect that will occur when the j-th candidate content item is displayed at the first content feed slot and the third candidate content item displayed at the second content feed slot.

It is noted that $a_{23}$ for interaction effects between the $2^{nd}$ and $3^{rd}$ content feed slots have a different value in matrix $Q_{12}$ than in matrix $Q_{13}$—since each interaction effect value for a is specific to a matrix' pairing of particular candidate content items j and j'. An interaction effect can be a clicking interaction effect that is a numerical value that represents a likelihood that a content item will be clicked on, when it is presented in a particular content feed slot, while another content item is presented in some other content feed slot. Each clicking interaction effect for a pair of content feed slots is based on historical member account click data from a plurality of member accounts. The historical member account click data indicates how many member accounts previously clicked on one of the paired content items when displayed at specific content feed slots. An interaction effect can be also be a complaint interaction effect that represents a likelihood that a member account will send a complaint response when a content item is presented in the particular content feed slot while another content item is presented in another content feed slot. As such, each complaint interaction effect for a pair of content items positioned in a specific pair of content feed slots is based on historical member account complaint data from the plurality of member accounts. The historical member account complaint data indicates how many target member accounts initiated complaint behaviors in response to the pair of items being displayed at specific content feed slots.

Figure 6:
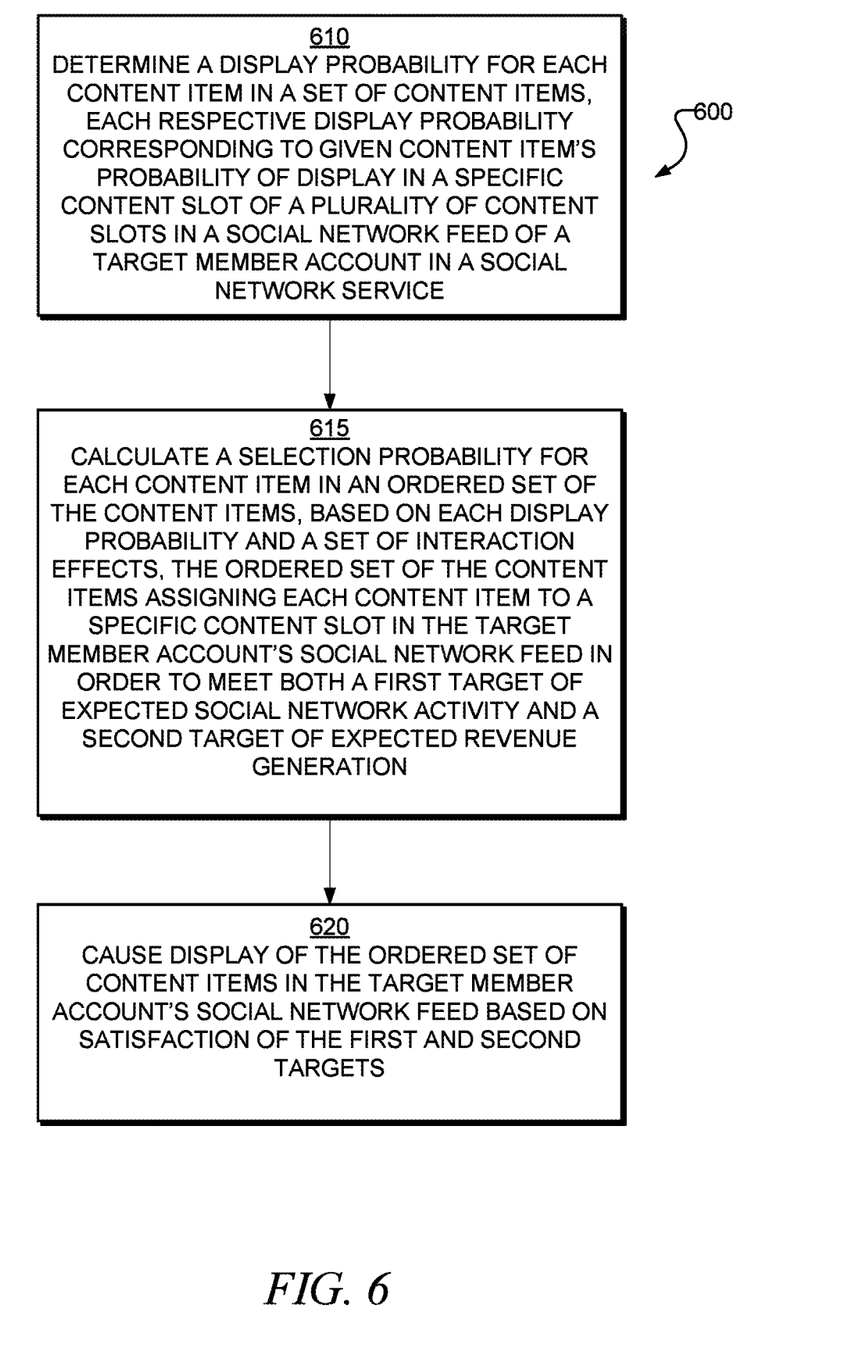
FIG. 6 is a flowchart illustrating an example method, according to various embodiments.

FIG. 6 is a flowchart 600 illustrating an example method, according to various embodiments.

At operation 610, the Content Optimization Engine 206 determines a display probability for each content item in a set of content items. Each respective display probability corresponds to a given content item's probability of display in a specific content slot of a plurality of content slots in a social network feed of a target member account in a social network service. It is understood that, in some embodiments, a probability of display of a given content item at a particular content feed slot can be contingent on the display of other content items being assigned for display at other respective content feed slots.

At operation 615, the Content Optimization Engine 206 calculates a selection probability for each content item in an ordered set of the content items, based on each display probability and a set of interaction effects. The ordered set of the content items assigns each content item to a specific content slot in the target member account's social network feed in order to meet both a first target of expected social network activity and a second target of expected revenue generation. It is understood that, in some embodiments, a probability of selection of a given content item at a particular content feed slot can be contingent on the display (and/or selection) of other content items being assigned for display at other respective content feed slots.

At operation 620, the Content Optimization Engine 206 causes display of the ordered set of content items in the target member account's social network feed based on satisfaction of the first and second targets.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
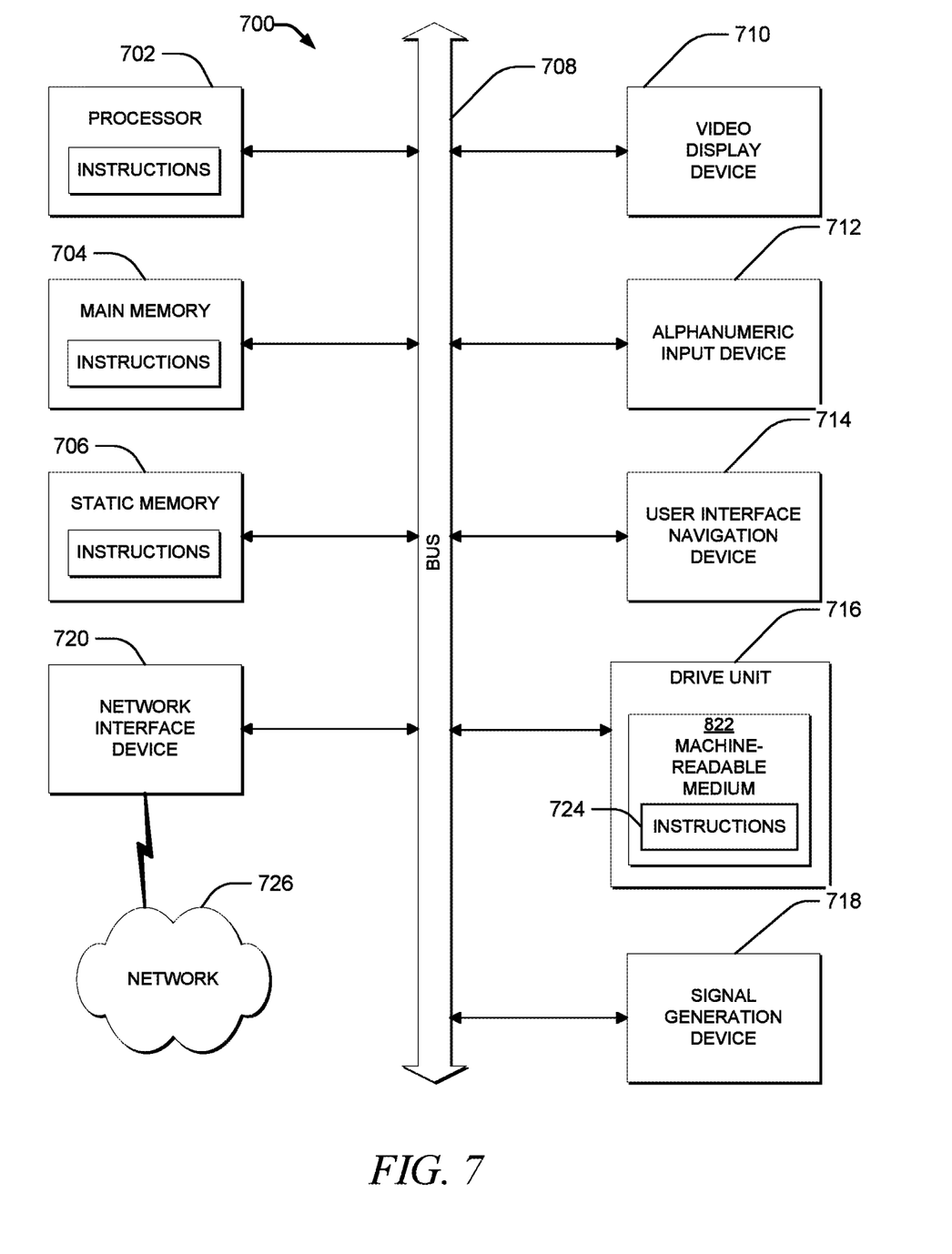
FIG. 7 is a block diagram of an example computer system on which operations, actions and methodologies described herein may be executed, in accordance with an example embodiment.

FIG. 7 is a block diagram of an example computer system 700 on which operations, actions and methodologies described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes a processor 702 (e.g., a central processing unit (CPU), a graphics processing unit (GPU) or both), a main memory 704, and a static memory 706, which communicate with each other via a bus 708. Computer system 700 may further include a video display device 710 (e.g., a liquid crystal display (LCD) or a cathode ray tube (CRT)). Computer system 700 also includes an alphanumeric input device 712 (e.g., a keyboard), a user interface (UI) navigation device 714 (e.g., a mouse or touch sensitive display), a disk drive unit 716, a signal generation device 718 (e.g., a speaker) and a network interface device 720.

Disk drive unit 716 includes a machine-readable medium 722 on which is stored one or more sets of instructions and data structures (e.g., software) 724 embodying or utilized by any one or more of the methodologies or functions described herein. Instructions 724 may also reside, completely or at least partially, within main memory 704, within static memory 706, and/or within processor 702 during execution thereof by computer system 700, main memory 704 and processor 702 also constituting machine-readable media.

While machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 724 may further be transmitted or received over a communications network 726 using a transmission medium. Instructions 724 may be transmitted using network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
   a processor;
   a memory device holding an instruction set executable on the processor to cause the computer system to perform operations comprising:
   ranking each of a plurality of content items in a set of content items in accordance with a single ranking criteria common to each of the plurality of content items;
   determining a display probability for each content item in the ranked plurality of content items, each respective display probability corresponding to a given content item's probability of display in a specific assigned content slot of a plurality of content slots in the feed;
   generating a set of interaction effects, a first interaction effect generated by calculating a probability of user interaction with a first content item assuming the first content item is assigned to a first content slot based on the ranking and modifying the probability of user interaction assuming a second content item is assigned to a second content slot in an order matching the ranking, a second interaction effect generated by modifying the probability of user interaction with the first content item assuming the second content item is assigned to a third content slot different than the second content slot and a third content item is assigned to the second content slot, in an order not matching the ranking, each interaction effect representative of activity in the online network that occurred due to concurrent display of a corresponding pair of content items to various member accounts of the plurality of members, each interaction effect generated based on historical activity, of member accounts, in response to concurrent display of the specific pair of content items;
   calculating a selection probability for each content item in an ordered set of the content items, based on each display probability and a set of interaction effects;
   assigning, from the ordered set of the content items, each content item to a specific content slot in the target member account's feed in order to meet both a first target of expected online network activity, as determined by the selection probability of each content item, the set of interaction effects, and a second target of expected revenue generation; and
   causing display of the ordered set of content items in the target member account's feed based on satisfaction of the first and second targets.

2. The computer system of claim 1, wherein a first type of activity represented in the set of interaction effects comprises a content selection by any of the various member account and a second type of activity represented in the set of interaction effects comprises a complaint behavior by any of the various member accounts.

3. The computer system of claim 1, further comprising:
   identifying, according to a machine learning data model, a set of content items relevant to the target member account based on at least one type of content item feature present in the set of contents and at least one type of member account feature present in profile data of the target member account, the at least one type of content item feature and the at least one type of member account feature identified in training data by the machine learning data model.

4. The computer system of claim 1, wherein the ordered set of content items comprises a diversity of content types that meets the first and second targets according to a multi-objective optimization algorithm.

5. The computer system of claim 1, wherein the first target of expected online network activity comprises a threshold amount of expected content selection by the target member account; and
   wherein the second target of expected revenue is met based on at least one type of sponsored content being included in the ordered set of content items.

6. The computer system of claim 1, wherein determining a display probability for each content item in a set of content items comprises:
   generating a first vector of vectors including at least a first display probability vector and a second display probability vector;
   wherein the first and second display probability vectors both have a vector size equal to a number of content slots in the target member account's feed;
   wherein each vector unit in the first and second display probability vectors represents a given content item's display at one of the content slot in the target member account's feed.

7. The computer system of claim 1, wherein calculating a selection probability for each content item in an ordered set of the content items comprises:
   generating a second vector of vectors including at least a first selection probability vector and a second selection probability vector;
   wherein the first and second selection probability vectors both have a vector size equal to the number of content slots in the target member account's feed;
   wherein each vector unit in the first and second selection probability vectors represents a given content item being selected when displayed at one of the content slot in the target member account's feed.

8. A computer-implemented method comprising:
   ranking each of a plurality of content items in a set of content items in accordance with a single ranking criteria common to each of the plurality of content items;

determining a display probability for each content item in the ranked plurality of content items, each respective display probability corresponding to a given content item's probability of display in a specific assigned content slot of a plurality of content slots in the feed;

generating a set of interaction effects, a first interaction effect generated by calculating a probability of user interaction with a first content item assuming the first content item is assigned to a first content slot based on the ranking and modifying the probability of user interaction assuming a second content item is assigned to a second content slot in an order matching the ranking, a second interaction effect generated by modifying the probability of user interaction with the first content item assuming the second content item is assigned to a third content slot different than the second content slot and a third content item is assigned to the second content slot, in an order not matching the ranking, each interaction effect representative of activity in the online network that occurred due to concurrent display of a corresponding pair of content items to various member accounts of the plurality of members, each interaction effect generated based on historical activity, of member accounts, in response to concurrent display of the specific pair of content items;

calculating a selection probability for each content item in an ordered set of the content items, based on each display probability and a set of interaction effects;

assigning, from the ordered set of the content items, each content item to a specific content slot in the target member account's feed in order to meet both a first target of expected online network activity, as determined by the selection probability of each content item, the set of interaction effects, and a second target of expected revenue generation; and causing display of the ordered set of content items in the target member account's feed based on satisfaction of the first and second targets.

9. The computer-implemented method of claim 8, wherein a first type of activity represented in the set of interaction effects comprises a content selection by any of the various member account and a second type of activity represented in the set of interaction effects comprises a complaint behavior by any of the various member accounts.

10. The computer-implemented method of claim 8, further comprising:
identifying, according to a machine learning data model, a set of content items relevant to the target member account based on at least one type of content item feature present in the set of contents and at least one type of member account feature present in profile data of the target member account, the at least one type of content item feature and the at least one type of member account feature identified in training data by the machine learning data model.

11. The computer-implemented method of claim 8, wherein the ordered set of content items comprises a diversity of content types that meets the first and second targets according to a multi-objective optimization algorithm.

12. The computer-implemented method of claim 8, wherein the first target of expected activity comprises a threshold amount of expected content selection by the target member account; and
wherein the second target of expected revenue is met based on at least one type of sponsored content being included in the ordered set of content items.

13. The computer-implemented method of claim 8, wherein determining a display probability for each content item in a set of content items comprises:
generating a first vector of vectors including at least a first display probability vector and a second display probability vector;
wherein the first and second display probability vectors both have a vector size equal to a number of content slots in the target member account's feed;
wherein each vector unit in the first and second display probability vectors represents a given content item's display at one of the content slot in the target member account's feed.

14. The computer-implemented method of claim 8, wherein calculating a selection probability for each content item in an ordered set of the content items comprises:
generating a second vector of vectors including at least a first selection probability vector and a second selection probability vector;
wherein the first and second selection probability vectors both have a vector size equal to the number of content slots in the target member account's feed;
wherein each vector unit in the first and second selection probability vectors represents a given content item being selected when displayed at one of the content slot in the target member account's feed.

15. A non-transitory computer-readable medium storing executable instructions thereon, which, when executed by a processor, cause the processor to perform operations including:
ranking each of a plurality of content items in a set of content items in accordance with a single ranking criteria common to each of the plurality of content items;
determining a display probability for each content item in the ranked plurality of content items, each respective display probability corresponding to a given content item's probability of display in a specific assigned content slot of a plurality of content slots in the feed;
generating a set of interaction effects, a first interaction effect generated by calculating a probability of user interaction with a first content item assuming the first content item is assigned to a first content slot based on the ranking and modifying the probability of user interaction assuming a second content item is assigned to a second content slot in an order matching the ranking, a second interaction effect generated by modifying the probability of user interaction with the first content item assuming the second content item is assigned to a third content slot different than the second content slot and a third content item is assigned to the second content slot, in an order not matching the ranking, each interaction effect representative of activity in the online network that occurred due to concurrent display of a corresponding pair of content items to various member accounts of the plurality of members, each interaction effect generated based on historical activity, of member accounts, in response to concurrent display of the specific pair of content items;
calculating a selection probability for each content item in an ordered set of the content items, based on each display probability and a set of interaction effects;
assigning, from the ordered set of the content items, each content item to a specific content slot in the target member account's feed in order to meet both a first target of expected online network activity, as determined by the selection probability of each content item, the set of interaction effects, and a second target of expected revenue generation; and causing display of the ordered set of content items in the target member account's feed based on satisfaction of the first and second targets.

16. The non-transitory computer-readable medium of claim 15, wherein a first type of activity represented in the set of interaction effects comprises a content selection by any of the various member account and a second type of activity represented in the set of interaction effects comprises a complaint behavior by any of the various member accounts.

17. The non-transitory computer-readable medium of claim 15, further comprising:

identifying, according to a machine learning data model, a set of content items relevant to the target member account based on at least one type of content item feature present in the set of contents and at least one type of member account feature present in profile data of the target member account, the at least one type of content item feature and the at least one type of member account feature identified in training data by the machine learning data model.

18. The computer system of claim 1, wherein each interaction effect occurs when a probability of a user's interaction with a first content item in the pair is modified based on a probability of the user's interaction with a second content item in the pair.

* * * * *